United States Patent
Lambert et al.

(10) Patent No.: US 7,857,360 B2
(45) Date of Patent: Dec. 28, 2010

(54) SNAP-IN-PLACE VALVED COUPLER

(75) Inventors: Todd D. Lambert, Brooklyn Park, MN (US); Shawn D. Ellis, Golden Valley, MN (US); Brian K. Foner, Saint Louis Park, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 594 days.

(21) Appl. No.: 11/740,489

(22) Filed: Apr. 26, 2007

(65) Prior Publication Data
US 2008/0174108 A1 Jul. 24, 2008

Related U.S. Application Data

(60) Provisional application No. 60/745,642, filed on Apr. 26, 2006.

(51) Int. Cl.
*F16L 21/06* (2006.01)
(52) U.S. Cl. .................. 285/322; 285/102; 285/137.11; 285/140.1; 285/324; 285/921; 137/528; 137/798
(58) Field of Classification Search .................. 285/18, 285/23, 31, 34, 35, 39, 102, 108, 137.11, 285/139.2, 139.3, 140.1, 141.1, 203, 204, 285/214–216, 210, 322, 324, 382.4, 921; 24/397, 453, 458, 607, 609; 251/149, 149.9; 411/45–48, 57.1, 54, 80.2, 80.5, 341–347, 411/552, 553, 554; 220/202, 203.1, 203.19, 220/203.2, 203.23; 138/89–95; 137/68.14, 137/219, 220, 247.29, 493.2, 528, 533.23, 137/540, 542, 543.13, 543.19, 798
See application file for complete search history.

(56) References Cited

U.S. PATENT DOCUMENTS

| | | | | | |
|---|---|---|---|---|---|
| 3,858,600 | A | * | 1/1975 | Appolos | 137/322 |
| 4,801,232 | A | * | 1/1989 | Hempel | 411/552 |
| 4,862,913 | A | * | 9/1989 | Wildfang | 137/543 |
| 4,908,895 | A | * | 3/1990 | Walker | 5/711 |
| 5,100,272 | A | * | 3/1992 | Jadoul et al. | 411/45 |
| 5,271,429 | A | * | 12/1993 | Bauer et al. | 137/543.23 |
| 5,482,080 | A | * | 1/1996 | Bergmann | 137/549 |
| 6,003,557 | A | * | 12/1999 | Brelig et al. | 138/89 |
| 6,234,194 | B1 | * | 5/2001 | Jainek et al. | 137/375 |
| 6,394,690 | B1 | * | 5/2002 | Bartholoma et al. | 403/290 |
| 7,293,758 | B2 | * | 11/2007 | Hsueh-Feng | 251/149.7 |
| 7,540,304 | B2 | * | 6/2009 | Cornwell | 137/860 |
| 2005/0236596 | A1 | * | 10/2005 | Nowling et al. | 251/149 |

FOREIGN PATENT DOCUMENTS

JP 06058463 A * 3/1994

* cited by examiner

*Primary Examiner*—James M Hewitt
*Assistant Examiner*—Jay R Ripley
(74) *Attorney, Agent, or Firm*—Renner, Otto, Boisselle & Sklar, LLP

(57) ABSTRACT

A coupler that can be configured for easy insertion and removal from an unthreaded cavity within a manifold or other part. The coupler includes an axially movable lock member that also carries a valve member for sealing against a valve seat of a main coupler body. The coupler also has a plurality of radially flexible fingers spaced apart by slots, and a lock member has one or more stop portions that engage the fingers to prevent radial collapse of the fingers for retention of the coupler in the cavity in the part.

16 Claims, 4 Drawing Sheets

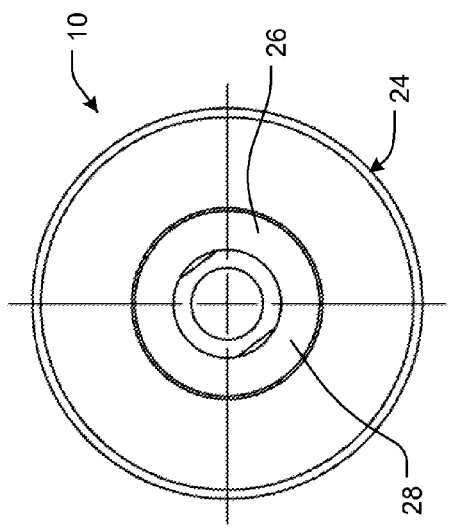
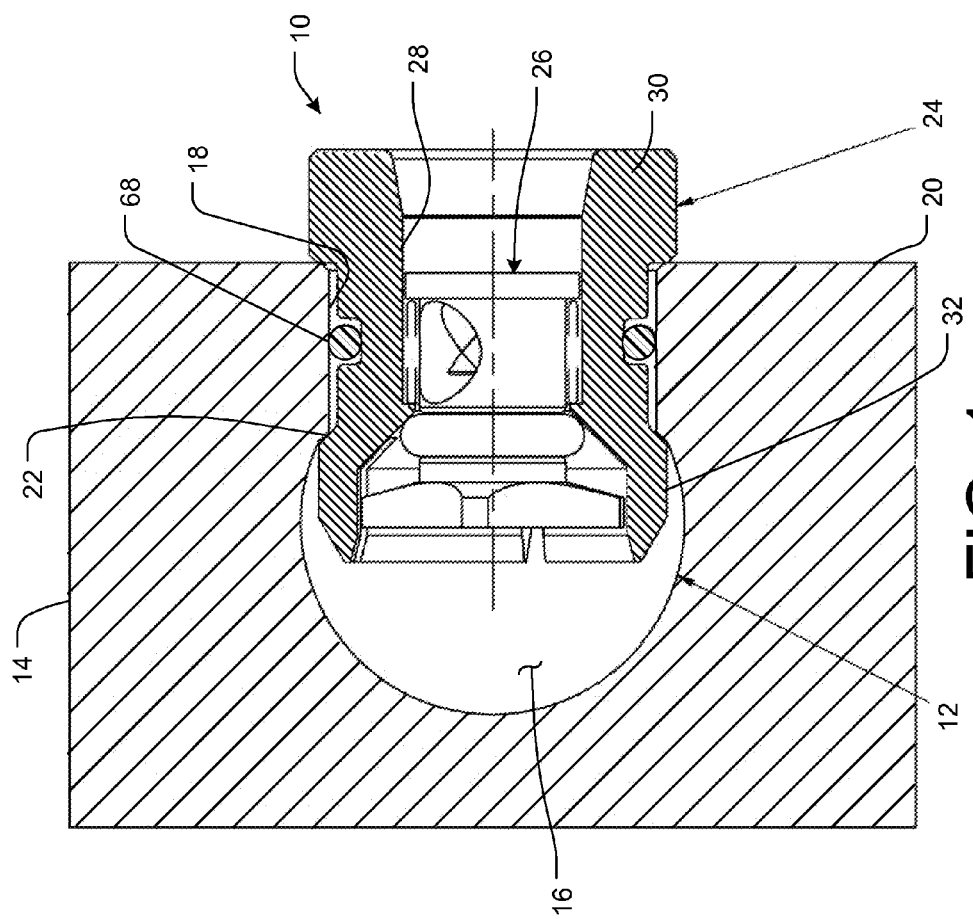

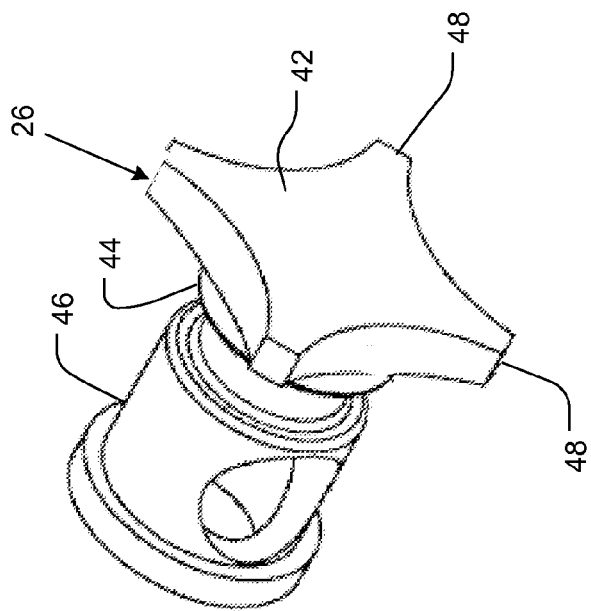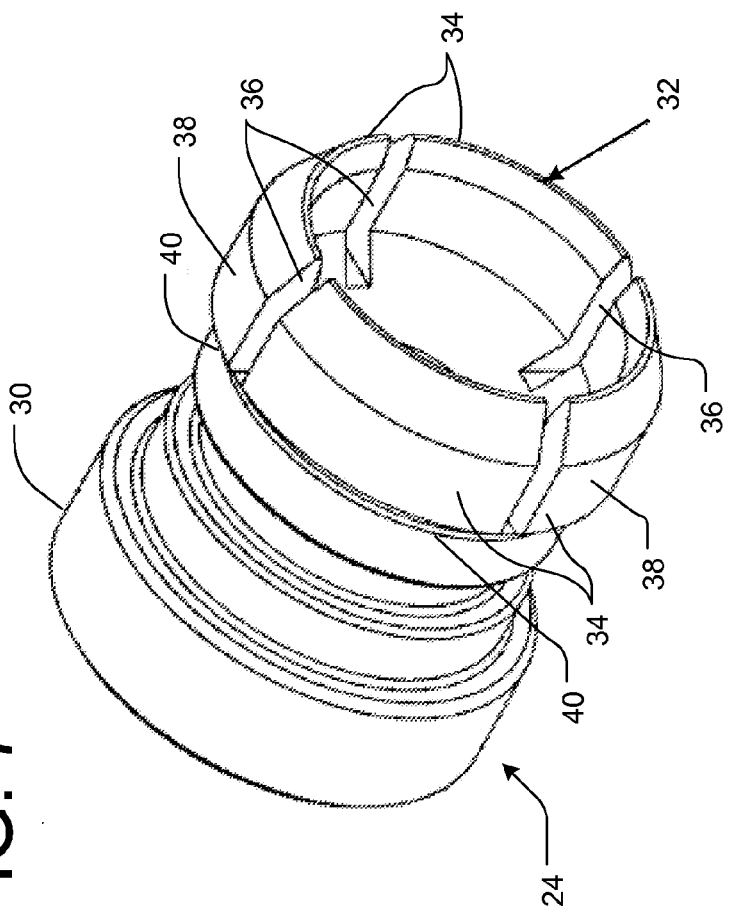

SNAP-IN-PLACE VALVED COUPLER

RELATED APPLICATIONS

This application claims the benefit of U.S. Provisional Application No. 60/745,642 filed Apr. 26, 2006, which is hereby incorporated by reference.

FIELD OF THE INVENTION

The herein described invention relates generally fluid couplers and more particularly to fluid couplers that can be quickly assembled into a manifold or other ported device, and which are particularly useful for low pressure pneumatic applications.

BACKGROUND OF THE INVENTION

Fluid couplers have been used to provide for fluid connections between various devices. In one configuration, mating manifold parts that have one or more flow passages to be connected, have been equipped from male and female couplers that mate with one another when the manifold parts are assembled together. One or both of the couplers typically would be screwed into the respective manifold part and then tightened to a specified torque. When installing a large number of couplers in one or more manifolds or other devices, the process of screwing and tightening can become tedious as well as time consuming. In addition, the threaded connection fixed the coupler to the manifold, thus requiring close tolerances to ensure that the coupler with properly mate with the other coupler when the manifold parts are brought together.

SUMMARY OF THE INVENTION

The present invention provides a coupler that can be configured for easy insertion and removal from an unthreaded cavity within a manifold or other part. According to one aspect of the invention, the coupler includes an axially movable lock member that also carries a valve member for sealing against a valve seat of a main coupler body. According to another aspect of the invention, the coupler has a plurality of radially flexible fingers spaced apart by slots, and a lock member has one or more stop portions that engage the fingers to prevent radial collapse of the fingers for retention of the coupler in the cavity in the part.

More particularly, the invention provides a coupler for snap-in-place connection in a cavity in a part, wherein the cavity has an enlarged width portion and a reduced width portion between the enlarged width portion and a face of the part to which the cavity opens, and the intersection of the enlarged and reduced width portions form a shoulder spaced inwardly from the face of the part. The coupler comprises a coupler body and a lock member disposed within an interior passage of the coupler body. The coupler body has a tubular main body portion and a connecting portion extending axially from the main body portion. The connecting portion is radially flexible between a reduced width condition for enabling insertion of the connection portion into the cavity and an enlarged width condition enabling the connecting portion to engage behind the shoulder of the cavity and thereby create an axial interference preventing the connecting portion from being withdrawn from the cavity. The lock member and connecting portion having surfaces that interfere through a range of axial movement of the lock member so as to hold the connecting portion in the enlarged width condition over such range of axial movement, thereby to prevent the connecting portion from contracting to its reduced width condition that would allow withdrawal of the connecting portion from the cavity. The surfaces do not interfere at least at a release position of the lock member outside the first range of movement so as to allow the connecting portion to contract to its reduced width condition, thereby to enable withdrawal from or insertion of the connecting portion into the cavity.

The lock member may be biased against movement towards its release position, as by means of a spring.

The connecting portion may include one or more radially movable fingers extending axially from the main body portion. The fingers may be bounded by axially extending slots each having a width allowing the fingers to radially contract from a radially expanded latching position to a radially contracted release position respectively corresponding to the enlarged and reduced width conditions of the connecting portion. The lock member has one or more stop portions operative over said range of axial movement of lock member to interfere with radial contraction of the fingers and movable out of engagement with the fingers at the release position of the lock member for allowing such radial contraction of the fingers.

The fingers may be resilient and unitary with the main body portion.

In a particular embodiment, the main body portion has a valve seat surrounding the interior passage, and the lock member has a valve member movable with the lock member into and out of engagement with the valve seat for opening and closing the interior passage. The tubular portion may project beyond the valve member, the tubular portion may have a shoulder, such that a spring may be interposed between the shoulder on the tubular portion and a shoulder on the main body portion surrounding the interior passage, the spring operating to resiliently bias the lock member away from its release position.

The valve member may be an annular elastomeric member retained in a groove on the lock member. The main body portion may have a valve seat surrounding the interior passage, and the lock member may have a valve member movable with the lock member into and out of engagement with the valve seat for opening and closing the interior passage.

According to another aspect of the invention, a coupler comprises a coupler body and a lock member. The coupler body has a tubular main body portion and a connecting portion extending axially from the main body portion. The connecting portion includes a plurality of resilient fingers that extend axially from the main body portion and are circumferentially spaced apart by respective axially extending slots that allow the fingers to radially contract from a radially expanded latching position to a radially contracted release position. The lock member has a plurality of circumferentially spaced apart stop portions for interfering with such radial contraction of the fingers so at to hold the fingers in the their radially expanded latching positions thereby to prevent withdrawal of the coupler from the socket when the fingers are engaged behind the shoulder.

The fingers may have radially outwardly protruding engaging portions at the ends thereof.

The lock member may be axially movable to a release position axially disengaged from the fingers so as to allow the fingers to contract to their radially contracted release position thereby to enable withdrawal from or insertion of the connecting portion into the cavity.

According to still another aspect of the invention, a method is provided for installing a coupler into a cavity in a part, wherein the cavity has a radially enlarged portion and a reduced width portion between the enlarged width portion and a face of the part to which the cavity opens, and the intersection of the enlarged and reduced width portions form a shoulder spaced inwardly from the face of the part. The method comprises axially moving a lock member disposed within an interior passage in a tubular coupler body to a release position so as to allow a connecting portion of the coupler body to contract to a reduced width condition permitting insertion of the connecting portion into the cavity; and axially shifting the lock member relative to the coupler body such that surfaces on the lock member and connecting portion interfere through a range of axial movement of the lock member so as to hold over such range of axial movement the connecting portion in an enlarged width condition that engages behind the shoulder to prevent withdrawal of the connecting portion from the cavity.

According to a further aspect of the invention, a method is provided for removing a coupler from a cavity in a part, wherein the cavity has a radially enlarged portion and a reduced width portion between the enlarged width portion and a face of the part to which the cavity opens, the intersection of the enlarged and reduced width portions form a shoulder spaced inwardly from the face of the part, and a lock member and connecting portion of a tubular coupler body have surfaces that interfere through a range of axial movement of the lock member so as to hold over such range of axial movement the connecting portion in an enlarged width condition that engages behind the shoulder to prevent withdrawal of the connecting portion from the cavity. The method of removing comprises axially moving the lock member to a release position so as to allow the connecting portion of the coupler body to contract to a reduced width condition permitting withdrawal of the connecting portion into the cavity.

Further features of the invention will become apparent from the following detailed description when considered in conjunction with the drawings.

BRIEF DESCRIPTION OF DRAWINGS

In the annexed drawings:

FIG. 1 is a cross-sectional view of an exemplary coupler according to the invention, shown installed in a cavity in a manifold and with the valve thereof in a closed position;

FIG. 2 is an end view of the coupler of FIG. 1;

FIG. 7 is a perspective view of the coupler body used in the coupler of FIG. 1; and FIG. 8 is a perspective view of the lock member used in the coupler of FIG. 1.

DETAILED DESCRIPTION

Figure 4:
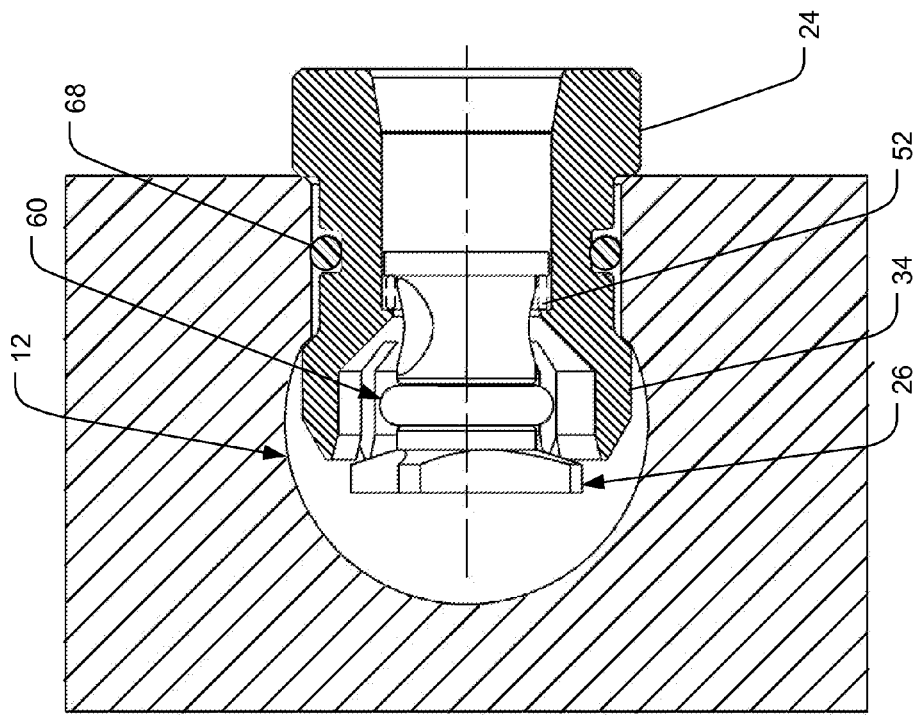
FIG. 4 is a cross-sectional view similar to FIG. 1, but showing the coupler in a condition for installation or removal.

Referring now to the drawings in detail and initially to FIG. 1, an exemplary coupler according to the invention is indicated generally at 10. The coupler 10 is configured for snap-in-place connection in a cavity 12 in a part 14, wherein the cavity 12 has an enlarged width portion 16 and a reduced width portion 18 between the enlarged width portion and a face 20 of the part to which the cavity opens. The intersection of the enlarged and reduced width portions form a shoulder 22, in particular an annular shoulder, spaced inwardly from the face 20 of the part. The enlarged width (diameter) portion may be formed by a cylindrical bore and the reduced with (diameter) portion may be formed by a smaller diameter bore perpendicular to the face 20 and the axis of the bore forming the enlarged width portion.

As seen in FIGS. 1, 2, 5 and 6, the coupler 10 comprises a coupler body 24 and a lock member 26 disposed within an interior passage 28 of the coupler body. The coupler body has a tubular main body portion 30 and a connecting portion 32 extending axially from the main body portion.

As described further below, the connecting portion 32 is radially flexible between a reduced width condition for enabling insertion of the connection portion into the cavity 12 and an enlarged width condition (shown in FIG. 1) enabling the connecting portion to engage behind the shoulder 22 of the cavity and thereby create an axial interference preventing the connecting portion from being withdrawn from the cavity. The lock member 26 and connecting portion having surfaces that interfere through a range of axial movement of the lock member so as to hold the connecting portion in the enlarged width condition over such range of axial movement, thereby to prevent the connecting portion from contracting to its reduced width condition that would allow withdrawal of the connecting portion from the cavity. The surfaces do not interfere at least at a release position of the lock member (shown in FIG. 4) outside the first range of movement so as to allow the connecting portion to contract to its reduced width condition, thereby to enable withdrawal from or insertion of the connecting portion into the cavity.

More particularly and as best in FIG. 7, the connecting portion 32 includes a plurality of radially movable fingers 34 extending axially from the main body portion 30. The fingers 34 are bounded by axially extending slots 36 each having a width allowing the fingers to radially contract from a radially expanded latching position (shown) to a radially contracted release position respectively corresponding to the enlarged and reduced width conditions of the connecting portion 32. The fingers, which preferably are resiliently flexible radially inwardly, extend from the main body portion in a cantilever-like fashion. The distal ends of the fingers may be provided with radially outwardly protruding teeth 38 having tapered surfaces 40 for engaging behind the somewhat tapered shoulder 22 in the illustrated embodiment.

The main body portion 30 and the connecting portion 32 including the fingers may be formed as a unitary structure (single piece). The coupler body may be made of any suitable material, but the construction thereof lends itself to molding from a suitable plastic material. As will be appreciated by those skilled in the art, the coupler body may be easily molded as can the lock member 26.

As seen in FIG. 8, the illustrated lock member 26 has a head portion 42, a reduced neck portion 44 and a tubular spring guide portion 46. The head portion has radially extending, circumferentially equally spaced apart stop portions 48 operative over a range of axial movement of lock member to interfering with radial contraction of the fingers. That is, when the stop portions are engaged with the radially inner surfaces of the fingers as seen in FIGS. 1 and 2, the fingers are prevented from collapsing radially inwardly to a diameter that can fit through the reduced diameter portion 18 of the cavity 12. Consequently, the teeth on the fingers will remain engaged with the shoulder, preventing withdrawal of the coupler from the cavity. The stop portion in an alternative embodiment could be circumferentially continuous, but the recesses separating the stop portions are provided to facilitate the flow of fluid past the head portion/stop member.

For insertion and removal of the coupler, the lock member 26 can be shifted axially to a release position seen in FIG. 4, disengaging the stop portions from the fingers. In the illustrated embodiment, the head/stop portions move axially beyond the end of the coupler body and clear of the fingers, so that the fingers can now flex radially inwardly to a reduced diameter to allow their passage through the reduced diameter portion of the cavity.

Figure 6:
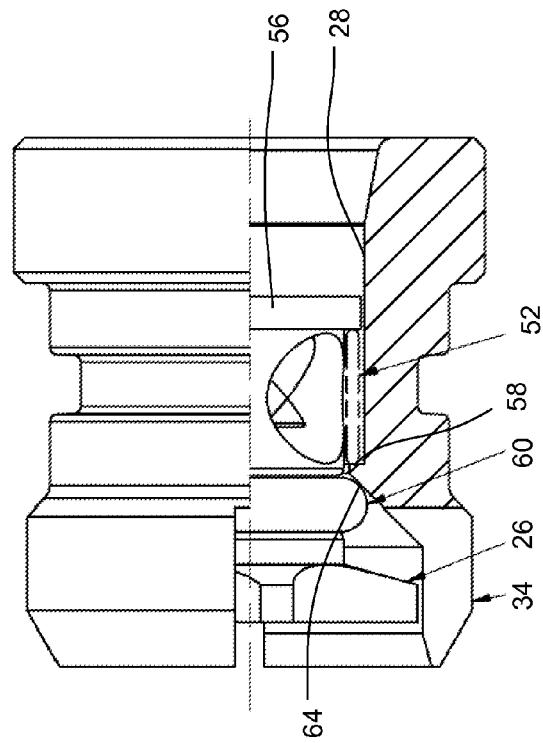
FIG. 6 is a side elevational view of the coupler of FIG. 1, partly broken away in section.

The lock member 26 preferably is biased away from its release position, as by means of a spring 52. In the illustrated embodiment, the spring may be interposed between a shoulder formed by a radially projecting flange 56 on the end of the tubular portion 46 and a shoulder 58 on the main body portion surrounding the interior passage as seen in FIG. 6. The spring operates to resiliently bias the lock member away from its release position. Such biasing of the lock member also biases an annular valve member 60 on the lock member against a valve seat surrounding the interior passage 28.

The annular seal member 60 cooperates with a valve seat 64 to open and close the interior passage 28. The valve seat is formed by the main body portion and surrounds the interior passage 28. The valve member, which may be an elastomeric O-ring retained in a groove in the outer surface of the lock member 26, is movable with the lock member into and out of engagement with the valve seat for opening and closing the interior passage. The spring 52 serves to normally bias the valve member to its closed position blocking the escape of fluid from the cavity 12. It perhaps should also be noted there that the outer diameter of the coupler body is sealed to the inner diameter surface of the reduced diameter portion of the cavity by an annular seal 68, such as an elastomeric O-ring, retained in a annular groove as seen in FIG. 1.

Figure 3:
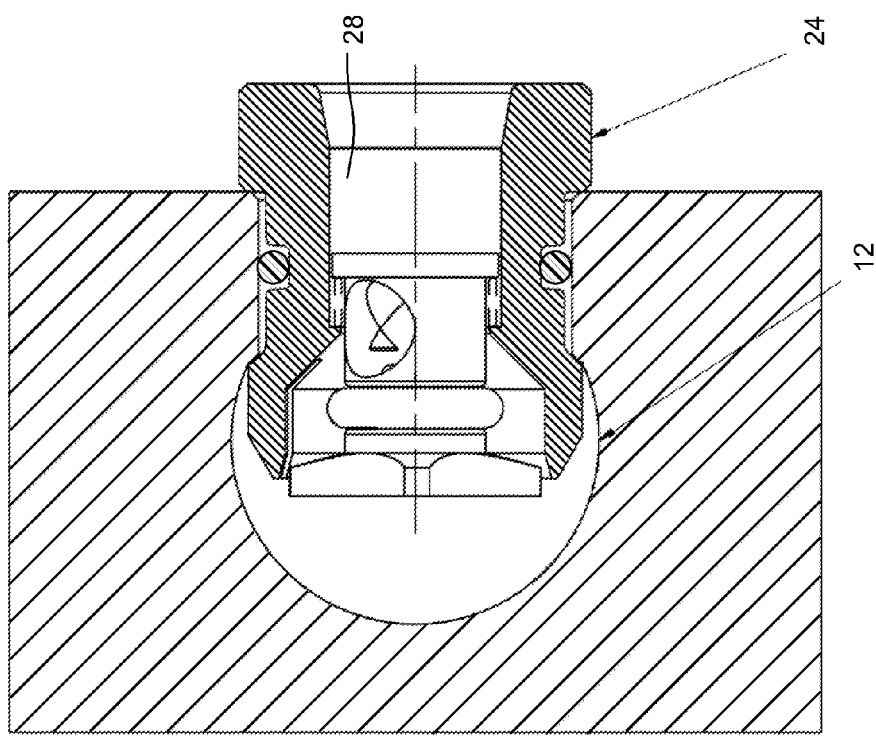
FIG. 3 is a cross-sectional view similar to FIG. 1, but showing the valve of the coupler in an open position.
Figure 5:
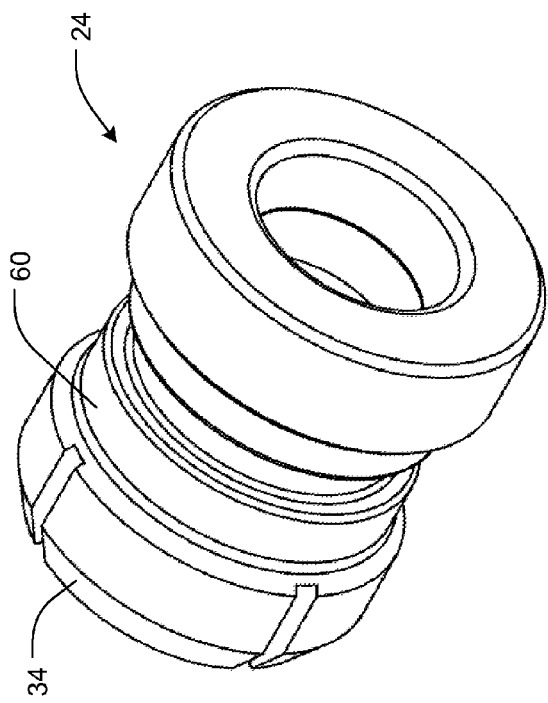
FIG. 5 is a perspective view of the coupler of FIG. 1.

As seen in FIG. 3, the valve member can shift axially to an open position permitting flow through the interior passage 28 of the coupling. This may be effected by pressure at the outer end of the passage being higher than pressure in cavity by an amount sufficient to move the valve member against the spring biasing force. Such movement could also be mechanically effected by a nipple or tube end portion inserted into the coupling and into engagement with the end of the lock portion. Such movement, however, should not be sufficient to move the lock member to its release position shown in FIG. 4.

When the lock member is shifted to its release position shown in FIG. 4, the connecting portion (finger 34) of the coupler body is free to contract radially inwardly to a reduced width condition permitting insertion of the connecting portion into the cavity or withdrawal in the opposite direction. For insertion, sloped leading ends of the fingers will engage the wall of the reduced width portion of the cavity and be cammed radially inwardly to allow the fingers to pass through the reduced width cavity portion. The lock member can be held in such release position during insertion by a pusher tool or the like inserted into the coupler body to engage and push the end of the lock member to the left in FIG. 4. Once fully inserted, the tool can be removed to allow the lock member to shift to the right with the stop portions disposed radially inwardly of the fingers. As will be appreciated, the stop portions remain operative over a range of axial movement allowing opening and closing of the valve member without disengaging the coupler from the cavity.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fluid coupler for snap-in-place connection in a cavity in a part, wherein the cavity has an enlarged width portion and a reduced width portion between the enlarged width portion and a face of the part to which the cavity opens, and the intersection of the enlarged and reduced width portions form a shoulder spaced inwardly from the face of the part, the coupler comprising a coupler body having a tubular main body portion and a connecting portion extending axially from the main body portion, the connecting portion including a plurality of resilient fingers that extend axially from the main body portion and are circumferentially spaced apart by respective axially extending slots that allow the fingers to radially contract from a radially expanded latching position to a radially contracted release position; and a lock member insertable into an interior passage in the coupler body and having stop portions for interfering with such radial contraction of the fingers so as to hold the fingers in the their radially expanded latching positions thereby to prevent withdrawal of the coupler from the socket when the fingers are engaged behind the shoulder;

the stop portions forming therebetween recesses to facilitate the flow of fluid past the stop portions, wherein the fingers have radially outwardly protruding engaging portions at the ends thereof, and wherein the lock member is axially movable to a release position disengaged from the fingers to allow the fingers to contract to their radially contracted release position thereby to enable withdrawal from or insertion of the connecting portion into the cavity.

2. A fluid coupler as set forth in claim 1, wherein the coupler body is made as a single piece.

3. A fluid coupler for snap-in-place connection in a cavity in a part, wherein the cavity has an enlarged width portion and a reduced width portion between the enlarged width portion and a face of the part to which the cavity opens, and the intersection of the enlarged and reduced width portions form a shoulder spaced inwardly from the face of the part, the coupler comprising:

a coupler body having a tubular main body portion and a connecting portion extending axially from the main body portion, the connecting portion being radially flexible between a reduced width condition for enabling insertion of the connection portion into the cavity and an enlarged width condition enabling the connecting portion to engage behind the shoulder of the cavity; and a lock member disposed within an interior passage in the coupler body, the lock member and connecting portion having surfaces that interfere through a range of axial movement of the lock member so as to hold the connecting portion in the enlarged width condition over such range of axial movement, thereby to prevent the connecting portion from contracting to its reduced width condition and thereby prevent the connecting portion from being withdrawn from the cavity, and which surfaces do not interfere at least at a release position of the lock member outside the range of axial movement so as to allow the connecting portion to contract to its reduced width condition, thereby to enable withdrawal from or insertion of the connecting portion into the cavity;

the surfaces on the lock member forming therebetween recesses to facilitate the flow of fluid past the surfaces, wherein the connecting portion includes a plurality of movable fingers extending axially from the main body portion, wherein the fingers have radially outwardly protruding engaging portions at the ends thereof, and wherein the lock member is axially movable to a release position disengaged from the fingers to allow the fingers to contract to their radially contracted release position thereby to enable withdrawal from or insertion of the connecting portion into the cavity.

4. The fluid coupler of claim 3, wherein the main body portion has a valve seat surrounding the interior passage, and the lock member has a valve member movable with the lock member into and out of engagement with the valve seat for opening and closing the interior passage.

5. A fluid coupler for snap-in-place connection in a cavity in a part, wherein the cavity has an enlarged width portion and a reduced width portion between the enlarged width portion and a face of the part to which the cavity opens, and the intersection of the enlarged and reduced width portions form a shoulder spaced inwardly from the face of the part, the coupler comprising:

a coupler body having a tubular main body portion and a connecting portion extending axially from the main body portion, the connecting portion being radially flexible between a reduced width condition for enabling insertion of the connection portion into the cavity and an enlarged width condition enabling the connecting portion to engage behind the shoulder of the cavity;

a lock member disposed within an interior passage in the coupler body, the lock member and connecting portion having surfaces that interfere through a range of axial movement of the lock member so as to hold the connecting portion in the enlarged width condition over such range of axial movement, thereby to prevent the connecting portion from contracting to its reduced width condition and thereby prevent the connecting portion from being withdrawn from the cavity, and which surfaces do not interfere at least at a release position of the lock member outside the range of axial movement so as to allow the connecting portion to contract to its reduced width condition, thereby to enable withdrawal from or insertion of the connecting portion into the cavity; and wherein the main body portion has a valve seat surrounding the interior passage, and the lock member has a valve member movable with the lock member into and out of engagement with the valve seat for opening and closing the interior passage.

6. A fluid coupler as set forth in claim 5, wherein the lock member includes a tubular portion projecting beyond the valve member, the tubular portion having a shoulder, and wherein a spring is interposed between the shoulder on the tubular portion and a shoulder on the main body portion surrounding the interior passage, the spring operating to resiliently bias the lock member away from its release position.

7. A fluid coupler as set forth in claim 5, wherein the valve member is an annular elastomeric member retained in a groove on the lock member.

8. A fluid coupler as set forth in claim 5 in combination with the part as set forth in claim 5, with the fluid coupler coupled to the part.

9. A fluid coupler for snap-in-place connection in a cavity in a part, wherein the cavity has an enlarged width portion and a reduced width portion between the enlarged width portion and a face of the part to which the cavity opens, and the intersection of the enlarged and reduced width portions form a shoulder spaced inwardly from the face of the part, the coupler comprising:

a coupler body having a tubular main body portion and a connecting portion extending axially from the main body portion, the connecting portion being radially flexible between a reduced width condition for enabling insertion of the connection portion into the cavity and an enlarged width condition enabling the connecting portion to engage behind the shoulder of the cavity;

a lock member disposed within an interior passage in the coupler body, the lock member and connecting portion having surfaces that interfere through a range of axial movement of the lock member so as to hold the connecting portion in the enlarged width condition over such range of axial movement, thereby to prevent the connecting portion from contracting to its reduced width condition and thereby prevent the connecting portion from being withdrawn from the cavity, and which surfaces do not interfere at least at a release position of the lock member outside the range of axial movement so as to allow the connecting portion to contract to its reduced width condition, thereby to enable withdrawal from or insertion of the connecting portion into the cavity; and wherein the lock member is biased against movement towards its release position by a resilient member interposed between axially opposed surfaces on the lock member and the coupler body, wherein the connecting portion includes a plurality of movable fingers extending axially from the main body portion, wherein the fingers are bounded by axially extending slots each having a width allowing the fingers to radially contract from a radially expanded latching position to a radially contracted release position respectively corresponding to the enlarged and reduced width conditions of the connecting portion, and the lock member has a plurality of stop portions for interfering with radial contraction of the fingers over said range of axial movement of the lock member and movable out of engagement with the fingers at the release position of the lock member for allowing such radial contraction of the fingers, and wherein the lock member terminates at a radially enlarged head portion, and the stop portions are formed by respective radially extending arms of the head portion that form therebetween fluid flow passages.

10. A fluid coupler as set forth in claim 9, wherein the stop portions are moved to a position beyond an end of the coupler body when the lock member is in its release position.

11. A fluid coupler as set forth in claim 9, wherein the radially movable fingers are circumferentially spaced apart by respective axially extending slots, and the stop portions are circumferentially spaced apart and correspondingly positioned stop portions on the lock member.

12. A fluid coupler as set forth in claim 11, wherein the fingers are resilient and unitary with the main body portion.

13. A fluid coupler as set forth in claim 9, wherein the main body portion has a valve seat surrounding the interior passage, and the lock member has a valve member movable with the lock member into and out of engagement with the valve seat for opening and closing the interior passage.

14. A fluid coupler as set forth in claim 13, wherein the lock member includes a tubular portion projecting beyond the valve member, the tubular portion having a shoulder, and wherein the resilient member is a spring is interposed between the shoulder on the tubular portion and a shoulder on the main body portion, the shoulder on the main body portion surrounding the interior passage, the spring operating to resiliently bias the lock member away from its release position.

15. A fluid coupler as set forth in claim 13, wherein the valve member is an annular elastomeric member retained in a groove on the lock member.

16. A fluid coupler as set forth in claim 9 in combination with the part as set forth in claim 9, with the fluid coupler coupled to the part.

* * * * *